(12) United States Patent
Hathiwala et al.

(10) Patent No.: US 8,601,689 B2
(45) Date of Patent: Dec. 10, 2013

(54) METHOD AND APPARATUS TO REPAIR A TURBOMACHINE ROTOR WHEEL

(75) Inventors: Yagnesh Dalpatbhai Hathiwala, Karnataka (IN); Ronald Stuart Denmark, Simpsonville, SC (US); Wilton Andrew Green, Jr., Greer, SC (US); Ashok Kumar Haveri Murigeppa, Karnataka (IN); Srinivas Ravi, Simpsonville, SC (US); Paul Anthony Santos, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 13/163,312

(22) Filed: Jun. 17, 2011

(65) Prior Publication Data

US 2012/0317808 A1    Dec. 20, 2012

(51) Int. Cl.
*B23P 6/00* (2006.01)

(52) U.S. Cl.
USPC .............. 29/889.1; 29/402.11; 416/219 R

(58) Field of Classification Search
USPC ........ 29/889.1, 700, 402.13, 402.11, 402.09; 416/219 R
See application file for complete search history.

(56) References Cited

U.S. PATENT DOCUMENTS

| | | | | |
|---|---|---|---|---|
| 4,141,124 A | * | 2/1979 | Ryan | 29/889.1 |
| 4,477,226 A | | 10/1984 | Carreno | |
| 4,822,248 A | * | 4/1989 | Wertz et al. | 416/192 |
| 4,897,519 A | * | 1/1990 | Clark et al. | 219/76.14 |
| 5,191,711 A | * | 3/1993 | Vickers et al. | 29/889.21 |
| 5,280,849 A | * | 1/1994 | Galanes | 228/119 |
| 5,735,044 A | * | 4/1998 | Ferrigno et al. | 29/889.1 |
| 5,755,031 A | * | 5/1998 | Baumgarten et al. | 29/889.1 |
| 6,551,032 B1 | | 4/2003 | Nolan et al. | |
| 6,615,470 B2 | * | 9/2003 | Corderman et al. | 29/402.13 |
| 6,676,336 B2 | | 1/2004 | Nolan et al. | |
| 7,353,588 B2 | * | 4/2008 | Crain et al. | 29/700 |
| 8,091,229 B2 | * | 1/2012 | Deak et al. | 29/889.1 |
| 8,381,379 B2 | * | 2/2013 | Holmes et al. | 29/254 |
| 2003/0086765 A1 | | 5/2003 | Nolan et al. | |
| 2003/0091399 A1 | | 5/2003 | Nolan et al. | |
| 2005/0172485 A1 | * | 8/2005 | Mussen | 29/889.1 |
| 2007/0039177 A1 | * | 2/2007 | Yoshioka et al. | 29/889.1 |
| 2009/0180885 A1 | * | 7/2009 | Rajarajan et al. | 416/204 A |
| 2011/0150636 A1 | * | 6/2011 | Tholen et al. | 415/173.1 |
| 2012/0216402 A1 | * | 8/2012 | Krizansky et al. | 29/889.1 |
| 2012/0237349 A1 | * | 9/2012 | Rajarajan et al. | 416/219 R |

FOREIGN PATENT DOCUMENTS

| GB | 2139709 A | 11/1984 |
|---|---|---|
| JP | 2004263701 A | 9/2004 |

* cited by examiner

*Primary Examiner* — Alexander P Taousakis
(74) *Attorney, Agent, or Firm* — Cantor Colburn LLP

(57) ABSTRACT

A method of repairing a turbomachine rotor wheel including a first outer circumferential edge extending to a second outer circumferential edge through a circumferential surface, a dovetail interface extending across the outer circumferential surface between the first and second outer circumferential edges, and a bucket mounted to the dovetail interface includes identifying a defect on one of the first and second outer circumferential edges of the rotor wheel adjacent the bucket, securing the bucket in the dovetail interface to substantially constrain axial movement, and removing a portion of the one of the first and second outer circumferential edges to remove the defect.

14 Claims, 6 Drawing Sheets

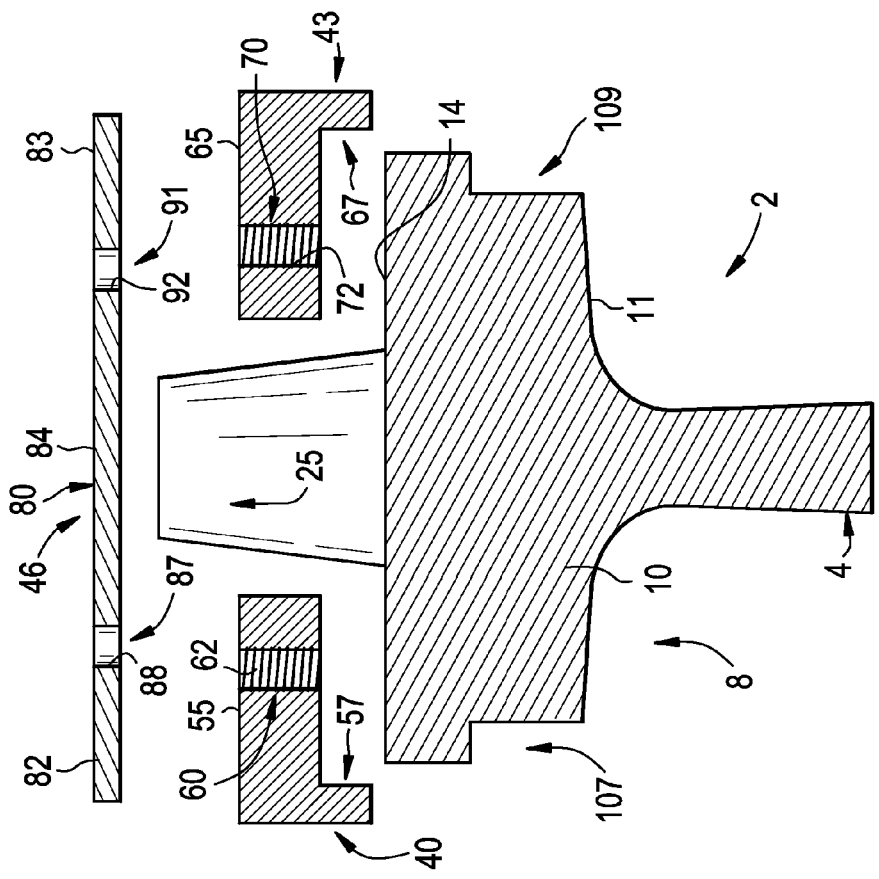
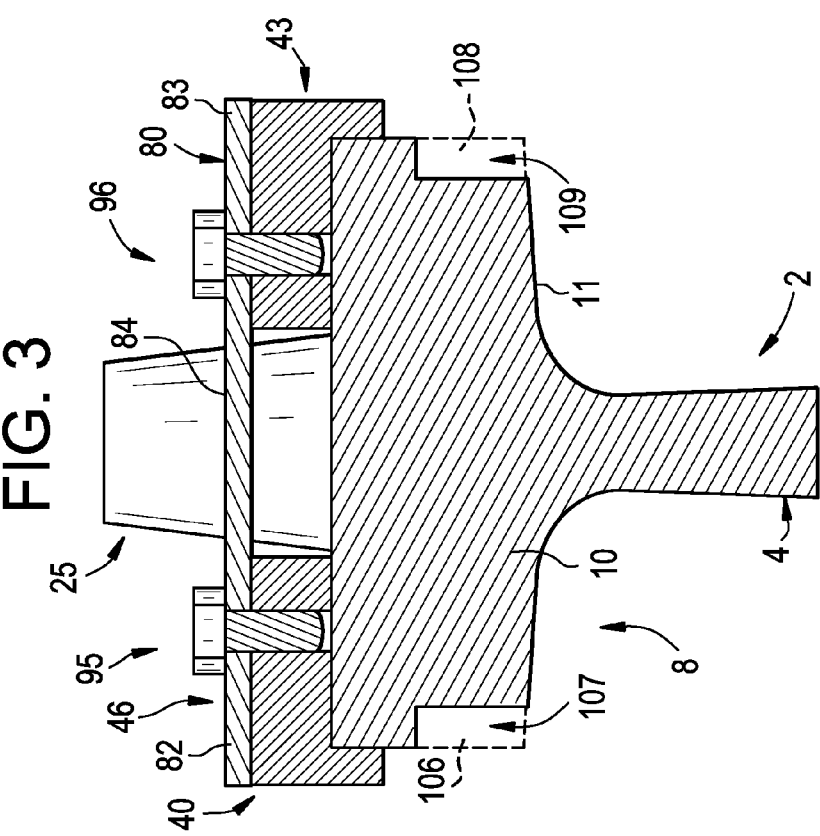

METHOD AND APPARATUS TO REPAIR A TURBOMACHINE ROTOR WHEEL

BACKGROUND OF THE INVENTION

The subject matter disclosed herein relates to the art of turbomachines and, more particularly, to a method and apparatus for repairing a gas turbine rotor wheel.

In general, turbomachines include a number of stages each having an associated rotor wheel. The rotor wheel includes an outer circumferential surface that supports a plurality of buckets or blades. The blades are secured to the rotor wheel through a dove tail interface provided on the outer circumferential surface. The dovetail interface includes a plurality of acute corners that define a dove tail slot that extends axially along the circumferential surface. Each bucket includes a base portion having a mating dovetail member. During operation, the rotor wheel rotates at very high speeds and is subjected to high thermal gradients. The high speeds and thermal gradients create stresses at the acute corners of the dovetail interface. Over time, cracks develop near the acute corners as a result of the stresses.

Conventional methods for repairing a rotor disk require removal of the blades and allow repair of cracks having a length of less than 0.25 inches (6.35 mm). In cases where the crack is greater than 0.25 inches, no repair option is presently available. As such, in the event a crack of greater than 0.25 inches is found, the rotor wheel must be scrapped. Scrapping a rotor wheel leads to a direct increase in operational cost of the turbomachine due to down time and service time required to dissemble the associated turbine stage, remove the rotor wheel, dissemble the blades, install the blades on a new rotor wheel and subsequently install the new rotor wheel in the turbomachine.

BRIEF DESCRIPTION OF THE INVENTION

According to one aspect of the exemplary embodiment, a method of repairing a turbomachine rotor wheel including a first outer circumferential edge extending to a second outer circumferential edge through a circumferential surface, a dovetail interface extending across the outer circumferential surface between the first and second outer circumferential edges, and a bucket mounted to the dovetail interface, includes identifying a defect on one of the first and second outer circumferential edges of the rotor wheel adjacent the bucket, securing the bucket in the dovetail interface to substantially constrain axial movement, and removing a portion of the one of the first and second outer circumferential edges to remove the defect.

According to another aspect of the exemplary embodiment, a rotor wheel repair apparatus includes a first rotor wheel ring having a first outer surface and a first annular recess configured and disposed to receive a first outer circumferential edge of a rotor wheel, a second rotor wheel ring having a second outer surface and a second annular recess configured and disposed to receive a second outer circumferential edge of the rotor wheel, and a linking bar having a first mounting element and a second mounting element. The first mounting element is configured and disposed to be joined to the first outer surface of the first rotor wheel ring and the second mounting element is configured and disposed to be joined with the second outer surface of the second rotor wheel ring.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a partial cross-sectional side view of the turbomachine rotor wheel of FIG. 1;

FIG. 4 is an exploded, partial cross-sectional view of the turbomachine rotor wheel of FIG. 3;

Figure 1:
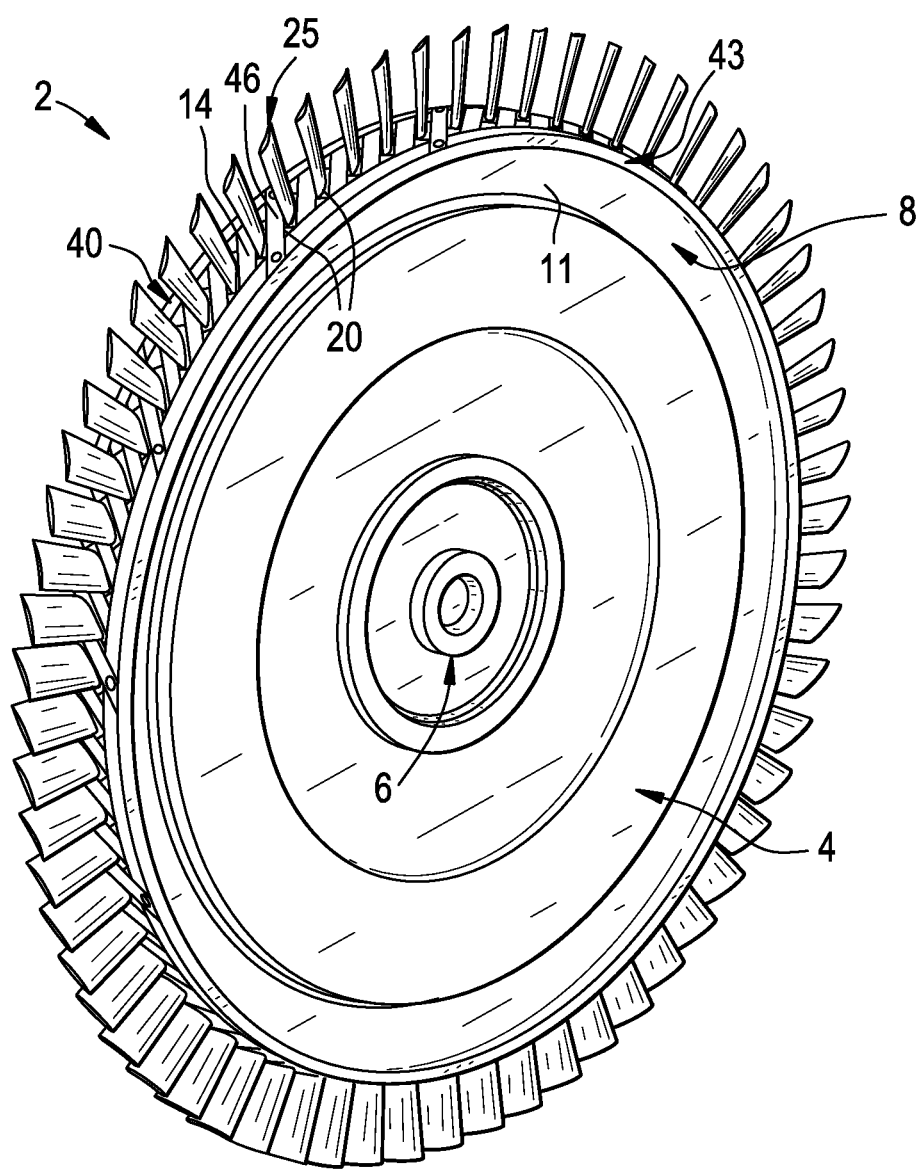
FIG. 1 is a perspective view of a turbomachine rotor wheel including a rotor wheel repair apparatus in accordance with an exemplary embodiment.
Figure 2:
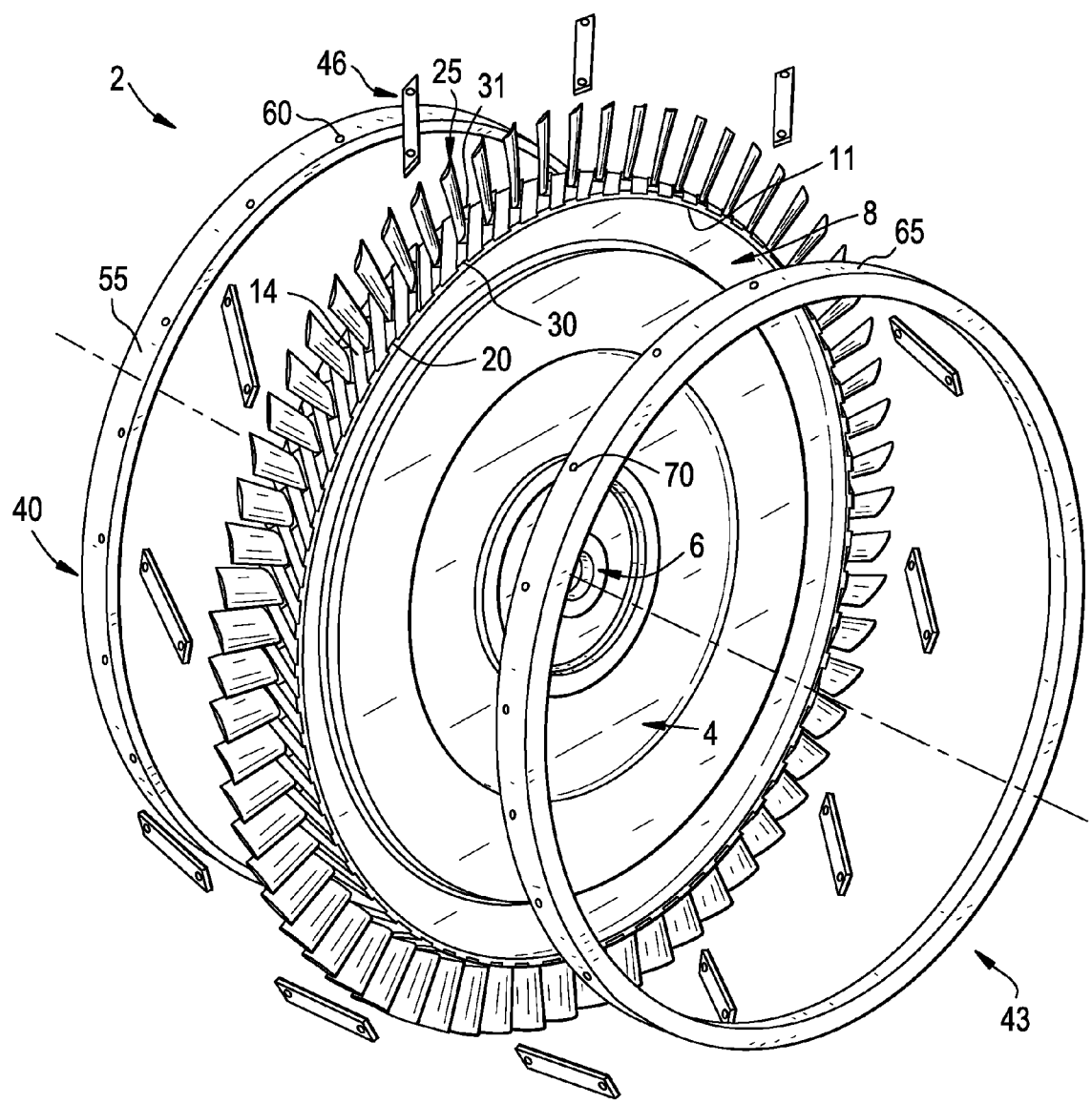
FIG. 2 is an exploded perspective view of the turbomachine rotor wheel of FIG. 1.
Figure 5:
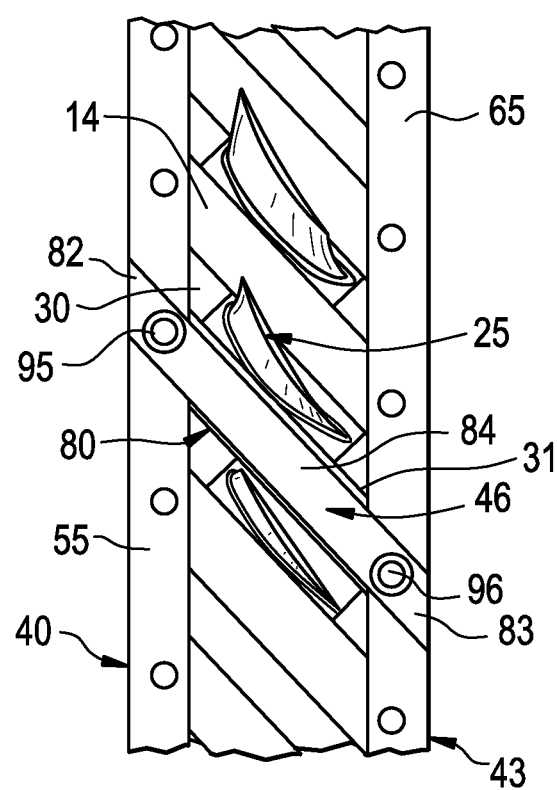
FIG. 5 is a partial top plan view of the turbomachine rotor wheel of FIG. 1.

The detailed description explains embodiments of the invention, together with advantages and features, by way of example with reference to the drawings.

DETAILED DESCRIPTION OF THE INVENTION

Referencing FIGS. 1-5, a turbomachine rotor wheel is indicated generally at 2. Rotor wheel 2 includes a body 4 having a central hub 6 and an outer rim 8. Outer rim 8 includes a first outer circumferential edge 10 and a second outer circumferential edge 11 that are separated by an outer surface 14. Outer surface 14 includes a plurality of dovetail grooves, one of which is indicated at 20, that are configured to receive a corresponding plurality of turbomachine buckets such as shown at 25. Buckets 25 are held in place by a first spacer 30 and a second or balance spacer 31. Of course, buckets 25 can be held in place by other means as will be discussed more fully below. During turbomachine operation, stresses induced by various forces result in crack formation in first and second outer circumferential edges 10 and 11. Over time, any defects such as cracks, pits, and the like will propagate and may lead to failure of a rotor wheel. Accordingly, it is desirable to repair any cracks before failure can occur. Thus, often times, rotor wheels are inspected both visually and with various testing equipment to locate and identify any cracks that may be present on the outer circumferential edges 10 and 11. Depending on crack size, the rotor wheel will be repaired as will be detailed more fully below.

In accordance with the exemplary embodiment, cracks having a length of from about 0.1 inches (2.54 mm) up to about 0.5 inches (12.7 mm) can be removed by machining turning grooves in the outer circumferential edges 10 and 11. Prior to any machining, buckets 25 must be fixed in dovetail grooves 20. In accordance with an exemplary embodiment, buckets 25 are retained to rotor wheel 2 with a first rotor wheel ring 40 positioned about first outer circumferential edge 10 and a second rotor wheel ring 43 positioned about second outer circumferential edge 11. A plurality of linking bars, one of which is indicated at 46, join first rotor wheel ring 40 to second rotor wheel ring 43. In this manner, buckets 25 are constrained to outer rim 8 when a turning groove is formed in first and second outer circumferential edges 10 and 11 as will be discussed more fully below.

In further accordance with the exemplary embodiment, first rotor wheel ring 40 includes an outer surface 55 and an annular recess 57 that is configured to receive first outer circumferential edge 10. First rotor wheel ring 40 also includes a plurality of mounting members, one of which is indicated at 60 that are arrayed about outer surface 55. Mounting members 60 take the form of threaded openings, such as indicated at 62 that extend from outer surface 55 toward annular recess 57. Similarly, second rotor wheel ring 43 includes an outer surface 65 and an annular recess 67. A plurality of mounting members, one of which is indicated at 70, are arrayed about outer surface 65. Mounting members 70 take the form of threaded openings 72 that extend from outer surface 65 toward annular recess 67.

Linking bar 46 includes a body member 80 having a first end 82 that extends to a second end 83 through an intermediate portion 84. First end 82 includes a first mounting element 87 that takes the form of an opening 88. Similarly, second end 83 includes a second mounting element 91 that takes the form of an opening 92. With this arrangement, linking bar 46 is positioned across outer surface 14 between adjacent buckets 25. First mounting element 87 is aligned or placed in registration with first mounting member 60 and second mounting element 91 is aligned or placed in registration with second mounting member 70. Once aligned, a first fastener 95 is passed through first mounting element 87 and engaged with threaded opening 62 and a second fastener 96 is passed through second mounting element 91 and engaged with threaded opening 72. At this point, additional linking bars (not separately labeled) are mounted between first and second rotor wheel rings 40 and 43 to constrain buckets 25 within dovetail grooves 20.

Figure 6:
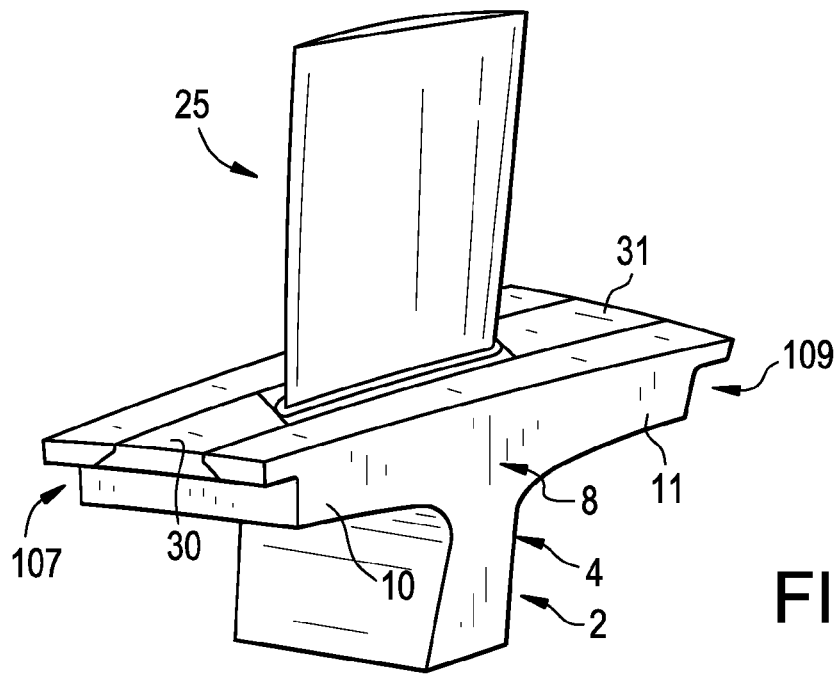
FIG. 6 is a partial perspective view of the turbomachine rotor wheel of FIG. 1 after a repair operation illustrating first and second spacers arranged to position a turbine bucket, at least one of the spacers being repaired in accordance with the exemplary embodiment.
Figure 7:
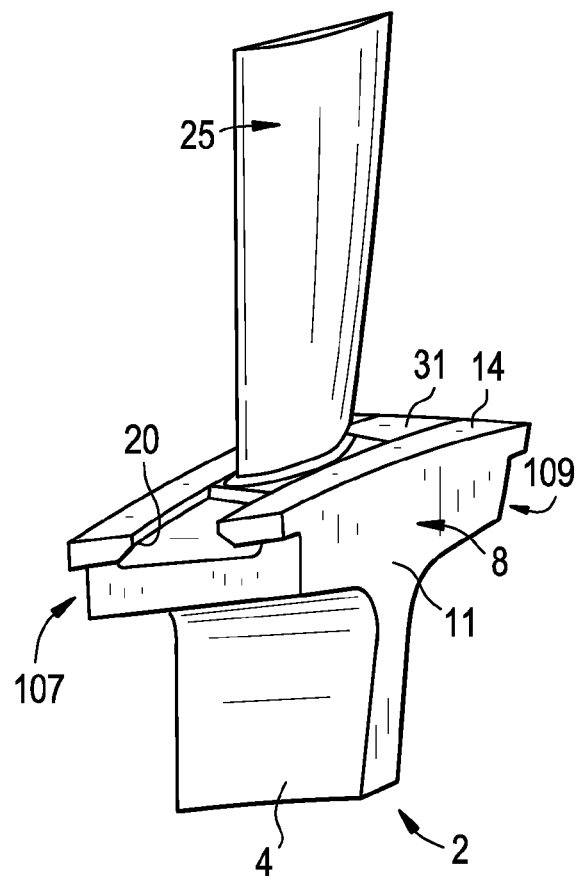
FIG. 7 is a perspective view of the turbomachine rotor wheel of FIG. 5 shown with one of the first and second spacers removed.

After securing first and second rotor wheel rings 40 and 43 to rotor wheel 2, a first portion of material 106 is removed from first outer circumferential edge 10 forming a first turning groove 107. (FIGS. 6 & &7) The removal of first portion of material 106 removes defects that may have formed at first outer circumferential edge 10. Similarly, a second portion of material 108 is removed from second outer circumferential edge 11 forming a second turning groove 109. The removal of second portion of material 108 removes defects from second outer circumferential edge 11. In the event that defects are only found on one of first and second outer circumferential edges 10 and 11, material may be removed from the other of the first and second outer circumferential edges 10 and 11 to provide any desired balance for rotor wheel 2.

Figure 8:
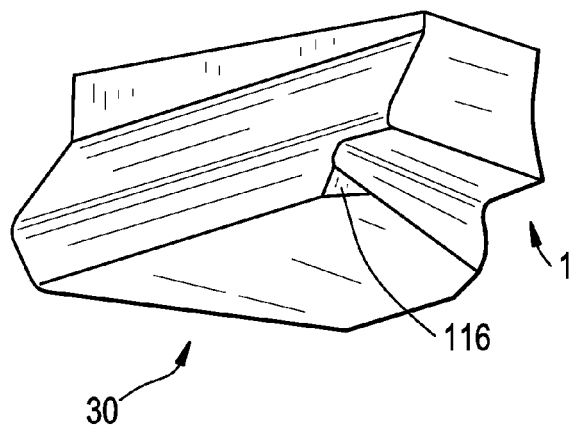
FIG. 8 is a lower right perspective view of one of the first and second spacers in accordance with one aspect of the exemplary embodiment.
Figure 9:
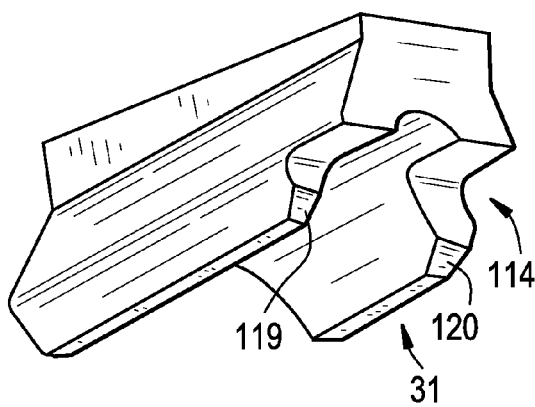
FIG. 9 is a lower right perspective view of one of the first and second spacers in accordance with another aspect of the exemplary embodiment.

As shown in FIGS. 8-9, removing first and second portions of material 106 and 108 to form corresponding first and second turning grooves 107 and 109 also results in material loss from spacers 30 and 31. More specifically, the formation of turning groove 107 results in a groove 111 (FIG. 8) formed in spacer 30 while turning groove 109 results in a groove 114 (FIG. 9) formed in spacer 31. The lost material that creates grooves 111 and 114 includes connecting portions that serve to secure spacers 30 and 31 to rotor wheel 2 in dovetail groove 20. Accordingly, after forming turning grooves 107 and 109, spacers 30 and 31 are removed from dovetail groove 20. A chamfer region 116 is formed on spacer 30, and first and second chamfer regions 119 and 120 are formed on spacer 31. Chamfer regions 116, 119, and 120 provide wedgeable surfaces that facilitate securing or staking spacers 30 and 31 to rotor wheel 2 in dovetail groove 20.

Figure 10:
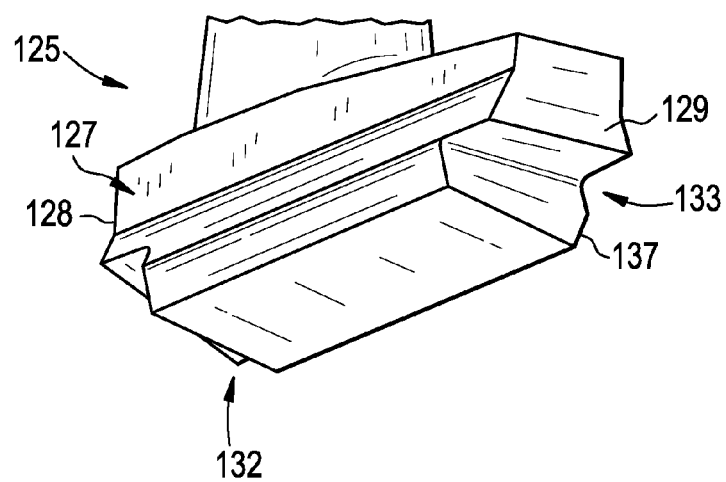
FIG. 10 is a partial lower right perspective view of a bucket repaired in accordance with the exemplary embodiment.

In certain arrangements spacers are not utilized. In such cases, a bucket, such as shown at 125 in FIG. 10, includes a base portion 127 having first and second end portions 128 and 129 that extend between first and second outer circumferential edges 10 and 11. The formation of turning grooves to take out defects leads to the creation of first and second grooves 132 and 133 in first and second end portions 128 and 129. In this arrangement, a chamfer region 137 is formed at one of the first and second end portions 128 and 129. Chamfer region 137 provide a wedgeable surface that facilitate securing or staking bucket 125 to rotor wheel 2 in dovetail groove 20.

At this point it should be understood that the exemplary embodiments describe a method and apparatus for repairing a turbomachine rotor wheel. The apparatus secures buckets to the rotor wheel during a repair operation. Securing the buckets allows for material to be removed from outer edge portions of the wheel to facilitate the removal of defects that may have formed. If left unsecured, the removal of the material would allow the buckets to slide out from the rotor wheel. Maintaining rotor wheel integrity allows turning grooves to be formed that can remove defects, such as cracks up to about 0.5 inches (12.7 mm). Previously, cracks over 0.25 inches (6.35 mm) required that the rotor wheel be taken out of service. Accordingly, the exemplary embodiments enable repair of rotor wheels that would otherwise been discarded. It should be understood that the term "defect" includes actual cracks, pits, cuts or other imperfections that may form or develop in the rotor wheel or buckets. Leaving the buckets on the wheel during repair leads to a desired final geometry of the wheel and spacer after any necessary repairs. That is, leaving the buckets on the wheel results in initial geometry of the assembly (pre-repair) being as close to a final geometry (post repair) as possible. In this manner, the cut face on the wheel and the cut face on the spacer are in alignment thereby eliminating potential windage heating.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of repairing a turbomachine rotor wheel including a first outer circumferential edge extending to a second outer circumferential edge through a circumferential surface, a dovetail interface extending across the outer circumferential surface between the first and second outer circumferential edges, a bucket mounted to the dovetail interface, the method comprising:

identifying a defect at one of the first and second outer circumferential edges of the rotor wheel adjacent the bucket;

securing the bucket in the dovetail interface by mounting a first rotor wheel ring about the first outer circumferential edge, mounting a second rotor wheel ring about the second outer circumferential edge, and linking the first rotor wheel ring to the second rotor wheel ring to substantially constrain axial movement; and removing a portion of the one of the first and second outer circumferential edges to remove the defect.

2. The method of claim 1, further comprising: simultaneously removing a portion of a spacer retaining the bucket in the dovetail interface along with the portion of the one of the first and second outer circumferential edges.

3. The method of claim 2, further comprising: staking the spacer to the rotor wheel in the dovetail interface.

4. The method of claim 2, further comprising: chamfering an outer edge of the spacer to form a stacking section.

5. The method of claim 4, further comprising: staking the spacer to the rotor member in the dovetail interface at the stacking section.

6. The method of claim 1, wherein linking the first rotor wheel ring to the second rotor wheel ring includes securing a linking bar to the first and second rotor wheel rings across the outer circumferential surface.

7. The method of claim 6, wherein securing the linking bar to the first and second rotor wheel rings includes passing a first fastener through the linking bar into the first rotor wheel ring, and passing a second fastener trough the linking bar into the second rotor wheel ring.

8. The method of claim 7, wherein passing the first fastener into the first rotor wheel ring includes threading the first fastener through the first rotor wheel ring into abutting engagement with the outer circumferential surface, and passing the second fastener into the second rotor wheel ring includes threading the first fastener through the second rotor wheel ring into abutting engagement with the outer circumferential surface.

9. The method of claim 1, wherein identifying the defect includes locating a crack that is greater than about 0.1 inches (2.54 mm) and up to about 0.5 inches (12.7 mm).

10. The method of claim 1, wherein removing the portion of the one of the first and second outer circumferential edges comprises machining a turning groove in the one of the first and second outer circumferential edges.

11. The method of claim 10, wherein machining a turning groove in the one of the first and second outer circumferential edges comprises machining a groove in the one of the first and second outer circumferential edges about an entire circumference of the rotor wheel.

12. The method of claim 1, wherein securing the bucket in the dovetail interface comprises simultaneously securing a plurality of buckets in respective dovetail interfaces formed in the outer circumferential surface.

13. The method of claim 1, further comprising: removing a portion of the other of the first and second outer circumferential edges.

14. The method of claim 13, wherein removing a portion of the other of the first and second outer circumferential edges comprises removing the portion of the one of the first and second outer circumferential edges about an entire circumference of the rotor wheel.

\* \* \* \* \*